(12) United States Patent
Tran et al.

(10) Patent No.: US 12,425,432 B2
(45) Date of Patent: Sep. 23, 2025

(54) SYSTEM AND METHOD FOR NETWORK INTRUSION DETECTION USING A NEURAL NETWORK IMPLEMENTED BY A CLOUD COMPUTING SYSTEM

(71) Applicant: Bank of America Corporation, Charlotte, NC (US)

(72) Inventors: Ngoc Anh Tran, Charlotte, NC (US); Manimaran Sundaravel, Chennai (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 193 days.

(21) Appl. No.: 18/473,063

(22) Filed: Sep. 22, 2023

(65) Prior Publication Data
US 2025/0106232 A1 Mar. 27, 2025

(51) Int. Cl.
| | |
|---|---|
| *G06F 15/16* | (2006.01) |
| *G06F 9/54* | (2006.01) |
| *G06N 3/08* | (2023.01) |
| *H04L 9/40* | (2022.01) |
| *H04L 29/06* | (2006.01) |

(52) U.S. Cl.
CPC .......... *H04L 63/1425* (2013.01); *G06N 3/08* (2013.01); *H04L 63/1416* (2013.01)

(58) Field of Classification Search
CPC .... H04L 63/1425; H04L 63/1416; G06N 3/08
USPC ........................................................ 726/23
See application file for complete search history.

(56) References Cited

U.S. PATENT DOCUMENTS

| | | |
|---|---|---|
| 7,337,161 B2 | 2/2008 | Fan et al. |
| 9,661,019 B2 | 5/2017 | Liu |
| 10,749,890 B1 | 8/2020 | Aloisio et al. |
| (Continued) | | |

FOREIGN PATENT DOCUMENTS

| | | |
|---|---|---|
| CN | 109698836 A | 4/2019 |
| CN | 111629006 A | 9/2020 |
| (Continued) | | |

OTHER PUBLICATIONS

U.S. Appl. No. 18/473,000, filed Sep. 22, 2023, entitled "System and method for network intrusion detection using a neural network implemented by a local computing system." Ngoc Anh Tran.

*Primary Examiner* — Hamza N Algibhah

(57) ABSTRACT

A method includes intercepting requests, which are analyzed to identify authenticated and suspicious requests. The suspicious requests are grouped into request groups based on respective geolocation information. A rate of requests is determined for a request group. In response to determining that the rate of requests is less than or equal to a request rate threshold, parameters of a suspicious request of the request group are analyzed to determining values of the parameters. In response to determining that the value of the parameters do not match with respective malicious parameter values stored in a block list, the suspicious request is analyzed using a neural network to identify if the suspicious request is legitimate or malicious. In response to identifying that the suspicious request is malicious, a notification indicating that the suspicious request is identified as malicious is sent, and the values of the parameters are added to the block list.

20 Claims, 6 Drawing Sheets

(56) References Cited

U.S. PATENT DOCUMENTS

| | | |
|---|---|---|
| 11,075,934 B1 | 7/2021 | Aldhaheri et al. |
| 11,089,051 B1* | 8/2021 | Long .................. H04L 63/1458 |
| 11,425,148 B2* | 8/2022 | Zawoad ................ G06N 20/20 |
| 11,463,472 B2 | 10/2022 | Chen et al. |
| 11,483,341 B2 | 10/2022 | Wei et al. |
| 11,522,881 B2 | 12/2022 | Chen et al. |
| 11,611,588 B2 | 3/2023 | Vasu |
| 11,621,970 B2 | 4/2023 | Soliman |
| 11,785,028 B1* | 10/2023 | Sevcenko ........... H04L 63/1416 |
| | | 726/23 |
| 11,934,520 B2* | 3/2024 | Batmaz .................. G06F 21/85 |
| 11,973,773 B2* | 4/2024 | Paranjpe ............ H04L 63/0245 |
| 12,088,606 B2* | 9/2024 | Prudkovskiy ....... H04L 63/0236 |
| 12,107,872 B2* | 10/2024 | Neupane ................ G06N 3/04 |
| 12,170,688 B1* | 12/2024 | Horelu ............... H04L 63/1416 |
| 2007/0101429 A1* | 5/2007 | Wakumoto ......... H04L 63/1425 |
| | | 726/23 |
| 2010/0235918 A1* | 9/2010 | Mizrahi ............... H04L 63/168 |
| | | 726/25 |
| 2014/0075558 A1* | 3/2014 | Ward .................. H04L 63/1425 |
| | | 726/23 |
| 2014/0096251 A1* | 4/2014 | Doctor ............... H04L 63/1441 |
| | | 726/23 |
| 2016/0065597 A1* | 3/2016 | Nguyen ............. H04L 63/1441 |
| | | 726/22 |
| 2016/0234232 A1* | 8/2016 | Poder ................ H04L 63/1416 |
| 2016/0352766 A1* | 12/2016 | Flacher .................. H04L 12/28 |
| 2017/0180394 A1* | 6/2017 | Crofton ................... G06F 21/64 |
| 2019/0174319 A1* | 6/2019 | Backholm ........... H04L 63/0281 |
| 2019/0238569 A1* | 8/2019 | Nandy ................ H04L 63/0227 |
| 2020/0042701 A1* | 2/2020 | Yang ...................... G06N 3/045 |
| 2020/0327225 A1 | 10/2020 | Nguyen et al. |
| 2020/0374297 A1* | 11/2020 | Bilas .................... H04L 67/146 |
| 2021/0037054 A1* | 2/2021 | Shultz ..................... H04L 63/20 |
| 2021/0112091 A1* | 4/2021 | Compton ........... H04L 63/1416 |
| 2021/0234892 A1* | 7/2021 | Narayanaswamy ........................ |
| | | H04L 63/1483 |
| 2021/0273958 A1 | 9/2021 | McLean |
| 2021/0359977 A1* | 11/2021 | Paranjpe ................ G06N 20/00 |
| 2021/0409430 A1* | 12/2021 | Alford .................. H04L 67/133 |
| 2022/0076126 A1* | 3/2022 | Luther .................... G06N 3/045 |
| 2022/0124108 A1 | 4/2022 | Gamble |
| 2022/0174075 A1* | 6/2022 | Bilas .................... H04L 63/1441 |
| 2022/0385674 A1 | 12/2022 | Donbosco et al. |
| 2023/0025946 A1 | 1/2023 | Li et al. |
| 2023/0072199 A1* | 3/2023 | Li ............................. G06N 5/01 |
| 2024/0129299 A1* | 4/2024 | Bandyopadhyay ... H04L 63/083 |
| 2024/0388505 A1* | 11/2024 | Sakazi .................. H04L 63/104 |
| 2025/0106238 A1* | 3/2025 | Tran ................... H04L 63/1416 |

FOREIGN PATENT DOCUMENTS

| | | |
|---|---|---|
| CN | 112788007 A | 5/2021 |
| CN | 113392932 A | 9/2021 |
| CN | 113468539 A | 10/2021 |
| CN | 113536299 A | 10/2021 |
| CN | 111970259 A | 4/2022 |

\* cited by examiner

SYSTEM AND METHOD FOR NETWORK INTRUSION DETECTION USING A NEURAL NETWORK IMPLEMENTED BY A CLOUD COMPUTING SYSTEM

TECHNICAL FIELD

The present disclosure relates generally to network security, and more specifically to a system and method for network intrusion detection using a neural network implemented by a cloud computing system.

BACKGROUND

Cloud computing is rapidly adopted because of its ability to reduce a cost of information technology infrastructure and increase flexibility and scalability of computer processing. Despite many benefits of cloud computing, issues related to security, data protection and data privacy still exist when large scale network traffic is processed by a cloud computing system.

SUMMARY

The system described in the present disclosure provides several practical applications and technical advantages that overcome the current technical problems with the network security.

In general, a system for network intrusion detection using a neural network implemented by a local computing system includes a network intrusion detection system communicatively coupled to a service provider system via a network. The network intrusion detection system is a local computing system or a stand-alone computing system. The service provider server may include a data storage system, a web server, a cloud computing system that hosts micro applications, or any other computing system that is configured to provide desired service to users. The network intrusion detection system is configured to intercept various incoming requests directed to the service provider system for a desired duration and analyzes the requests to determine if the requests are legitimate or malicious. The incoming requests may be received from one or more authenticated users/respective user devices or one or more malicious users/respective user devices. The network intrusion detection system is configured to identify authenticated requests that originate from one or more authenticated users and forwards them to the service provider system for further processing. The network intrusion detection system identifies remaining requests as suspicious requests. The network intrusion detection system is configured to analyze geolocation information and a request rate of the suspicious requests to identify malicious requests. The network intrusion detection system is further configured to implement a neural network module that is configured to analyze parameter values of each remaining suspicious request and identify each suspicious request as legitimate or malicious. The network intrusion detection system is further configured to forward legitimate requests to the service provider system and prevent malicious requests from reaching the service provider system. The network intrusion detection system is further configured to send notifications to a network administrator when malicious requests are identified.

In general, a system network intrusion detection using a neural network implemented by a cloud computing system includes a network intrusion detection system communicatively coupled to a service provider system via a network. The network intrusion detection system is a could computing system that includes a plurality of nodes. Each node is configured to implement a neural network module and store a block list that includes a list of parameter values that are associated with parameters of malicious requests. The service provider server may include a data storage system, a web server, a cloud computing system that hosts micro applications, or any other computing system that is configured to provide desired service to users. A node of the network intrusion detection system is configured to intercept various incoming requests directed to the service provider system from a respective geographical region for a desired duration and analyzes the requests to determine if the requests are legitimate or malicious. The incoming requests may be received from one or more authenticated users/respective user devices or one or more malicious users/respective user devices. The node is configured to identify authenticated requests that originate from one or more authenticated users and forwards them to the service provider system for further processing. The node identifies remaining requests as suspicious requests. The node is configured to analyze geolocation information and a request rate of the suspicious requests to identify malicious requests. The node is further configured to implement the neural network module that is configured to analyze parameter values of each remaining suspicious request and identify each suspicious request as legitimate or malicious. The node is further configured add parameter values of suspicious requests that have been identified as malicious to the block list and synchronize the block list across other nodes of the intrusion detection system. The node is further configured to forward legitimate requests to the service provider system and prevent malicious requests from reaching the service provider system and send notifications to a network administrator when malicious requests are identified.

The present disclosure provides various advantages. By providing notifications to a network administrator, a network intrusion detection system allows for early detection of network intrusions such as, for example, distributed denial-of-service (DDOS) attacks. By preventing malicious requests from reaching a service provider system, the network intrusion detection system prevents network intrusions. This in turn improves network security of the service provider system. Furthermore, in embodiments when the network intrusion detection system is a cloud computing system, even if one or more nodes of the network intrusion detection system are down, intercepted requests may be redirected to operating nodes, which reduces or eliminated downtime of the network intrusion detection system. Accordingly, the following disclosure is particularly integrated into a practical application of improving network security of a computing system such as, for example, a service provider system.

In one embodiment, a system includes a memory and a processor communicatively coupled to the memory. The memory is configured to store a request rate threshold and acceptable parameter value ranges for parameters of a legitimate request. The legitimate request includes a request that originates from an authenticated user. The processor is configured to implement a neural network module. The processor is configured to intercept a plurality of requests directed to a service provider system for a first duration and analyze the plurality of requests to identify authenticated requests from the plurality of requests. Each request includes a request for a service from the service provider system. The authenticated requests originate from one or more authenticated users. The processor is further configured to identify remaining requests as suspicious requests, analyze each suspicious request to determine respective geolocation information of a respective location from which each suspicious request originates, and group the suspicious requests into a plurality of request groups based on the determined geolocation information. A first request group is associated with a first geolocation information and includes a first plurality of suspicious requests associated with the first geolocation information. A second request group is associated with a second geolocation information and includes a second plurality of suspicious requests associated with the second geolocation information. The second geolocation information is different from the first geolocation information. The processor is further configured to determine a first rate of requests for the first request group and determine a second rate of requests for the second request group. In response to determining that the first rate of requests for the first request group is less than or equal to the request rate threshold, the processor is further configured to analyze parameters of a first suspicious request of the first request group to determine values of the parameters of the first suspicious request. In response to determining that the values of the parameters of the first suspicious request is not within respective acceptable parameter value ranges, the processor is further configured to analyze the first suspicious request using the neural network module to identify if the first suspicious request is legitimate or malicious. In response to identifying that the first suspicious request is malicious, the processor is further configured to send a first notification that the first suspicious request is identified as malicious.

In another embodiment, a system includes a plurality of nodes. A first node includes a memory and a processor communicatively coupled to the memory. The memory is configured to store a request rate threshold and a block list. The block list includes a list of malicious parameter values associated with parameters of malicious requests. A malicious request includes a request that originates from a malicious user. The processor is configured to implement a neural network module. The processor is further configured to intercept a plurality of requests directed to a service provider system from a respective geographical region for a first duration and analyze the plurality of requests to identify authenticated requests from the plurality of requests. Each request includes a request for a service from the service provider system. The authenticated requests originate from one or more authenticated users. The processor is further configured to identify remaining requests as suspicious requests, analyze each suspicious request to determine respective geolocation information of a respective location from which each suspicious request originates, and group the suspicious requests into a plurality of request groups based on the determined geolocation information. A first request group is associated with a first geolocation information and includes a first plurality of suspicious requests associated with the first geolocation information. A second request group is associated with a second geolocation information and includes a second plurality of suspicious requests associated with the second geolocation information. The second geolocation information is different from the first geolocation information. The processor is further configured to determine a first rate of requests for the first request group and determine a second rate of requests for the second request group. In response to determining that the first rate of requests for the first request group is less than or equal to the request rate threshold, the processor is further configured to analyze parameters of a first suspicious request of the first request group to determine values of the parameters of the first suspicious request. In response to determining that the value of the parameters of the first suspicious request do not match with respective malicious parameter values, the processor is further configured to analyze the first suspicious request using the neural network module to identify if the first suspicious request is legitimate or malicious. In response to identifying that the first suspicious request is malicious, the processor is further configured to send a first notification that the first suspicious request is identified as malicious, add the values of the parameters of the first suspicious request to the block list, and synchronize the block list with other nodes of the plurality of nodes.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
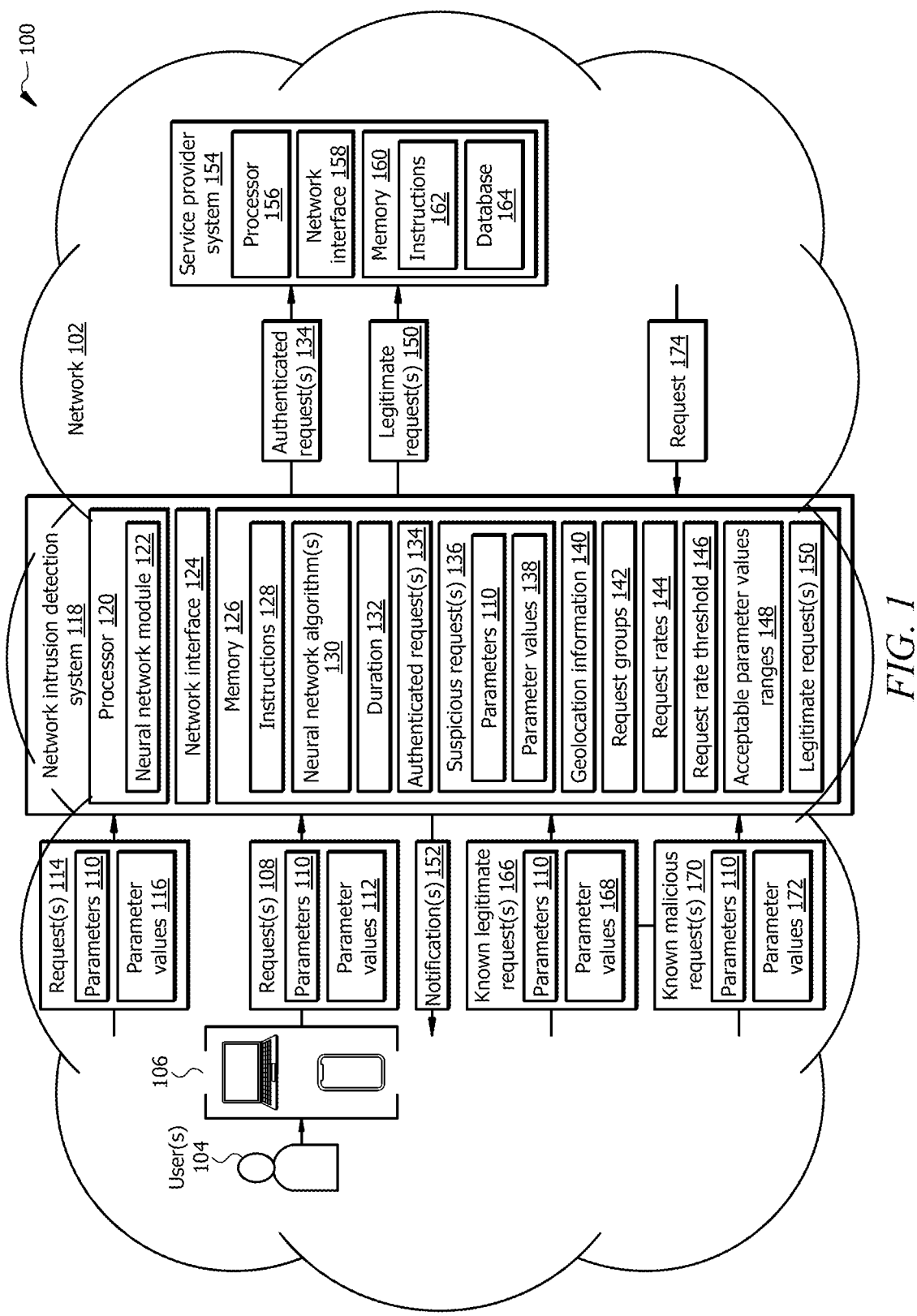
FIG. 1 illustrates an embodiment of a system configured for network intrusion detection using a neural network implemented by a local computing system.
Figure 2A:
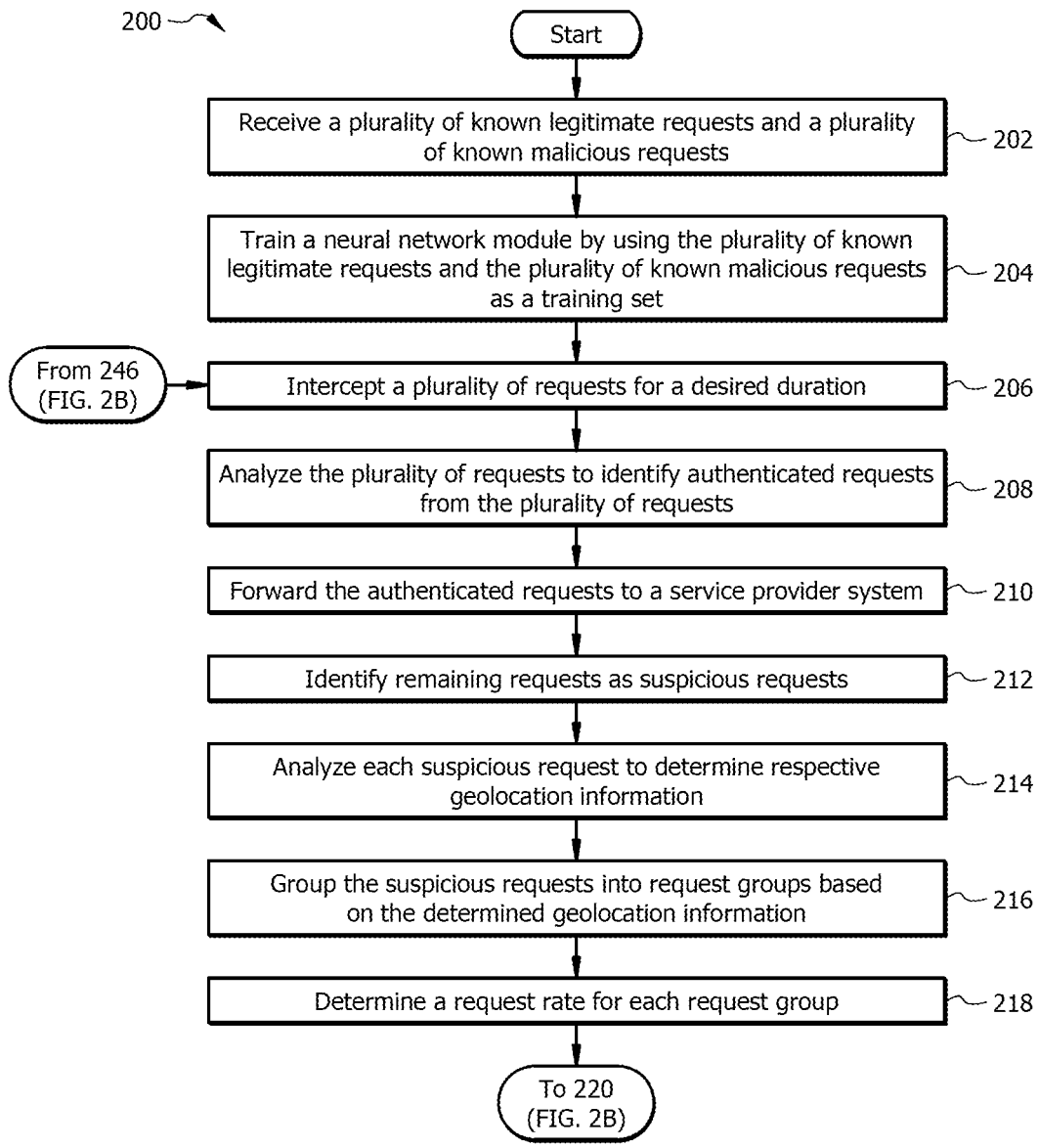
FIGS. 2A and 2B illustrate an example operational flow of the system of FIG. 1 for network intrusion detection using a neural network implemented by a local computing system.
Figure 2B:
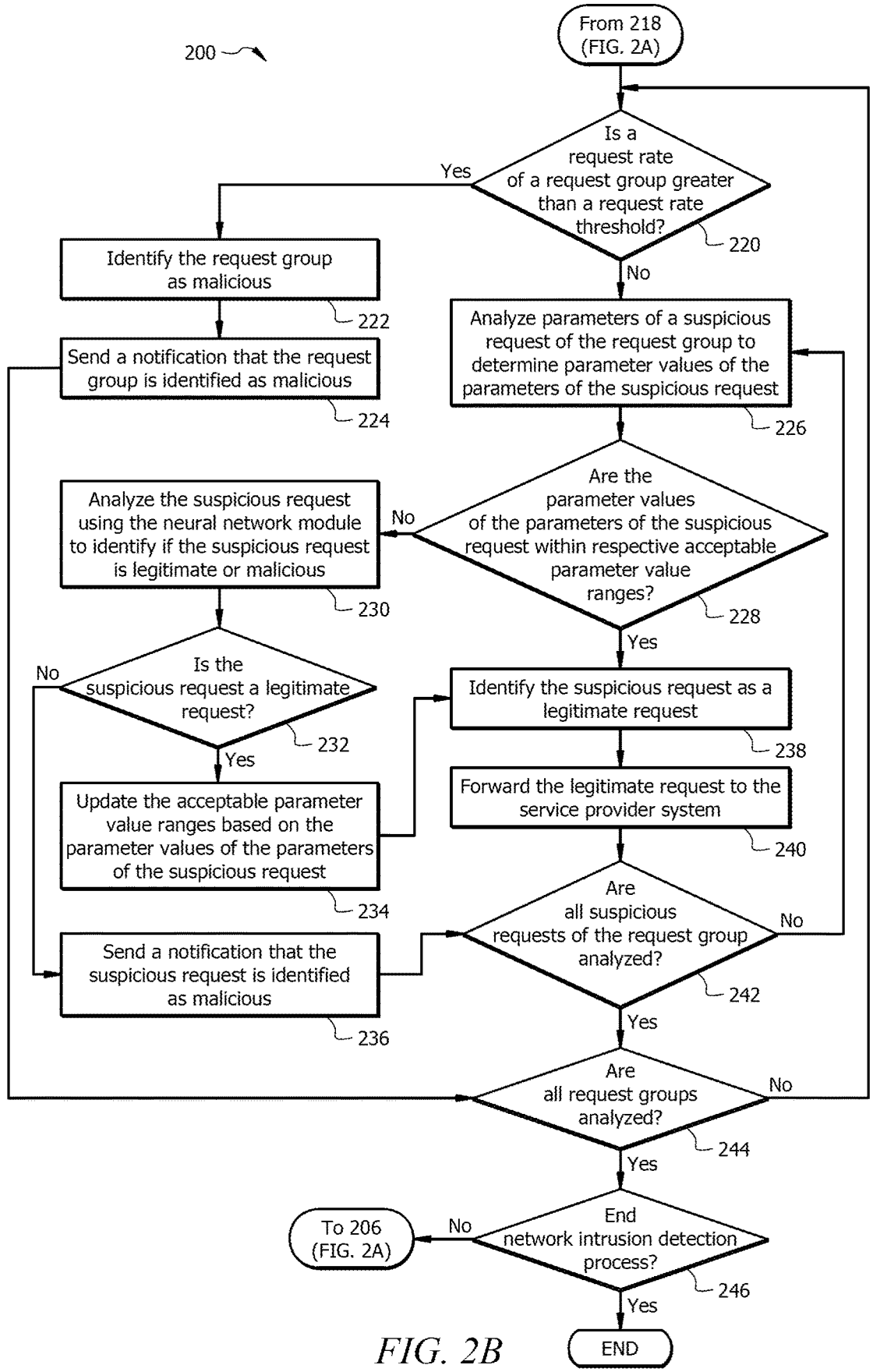
Figure 3:
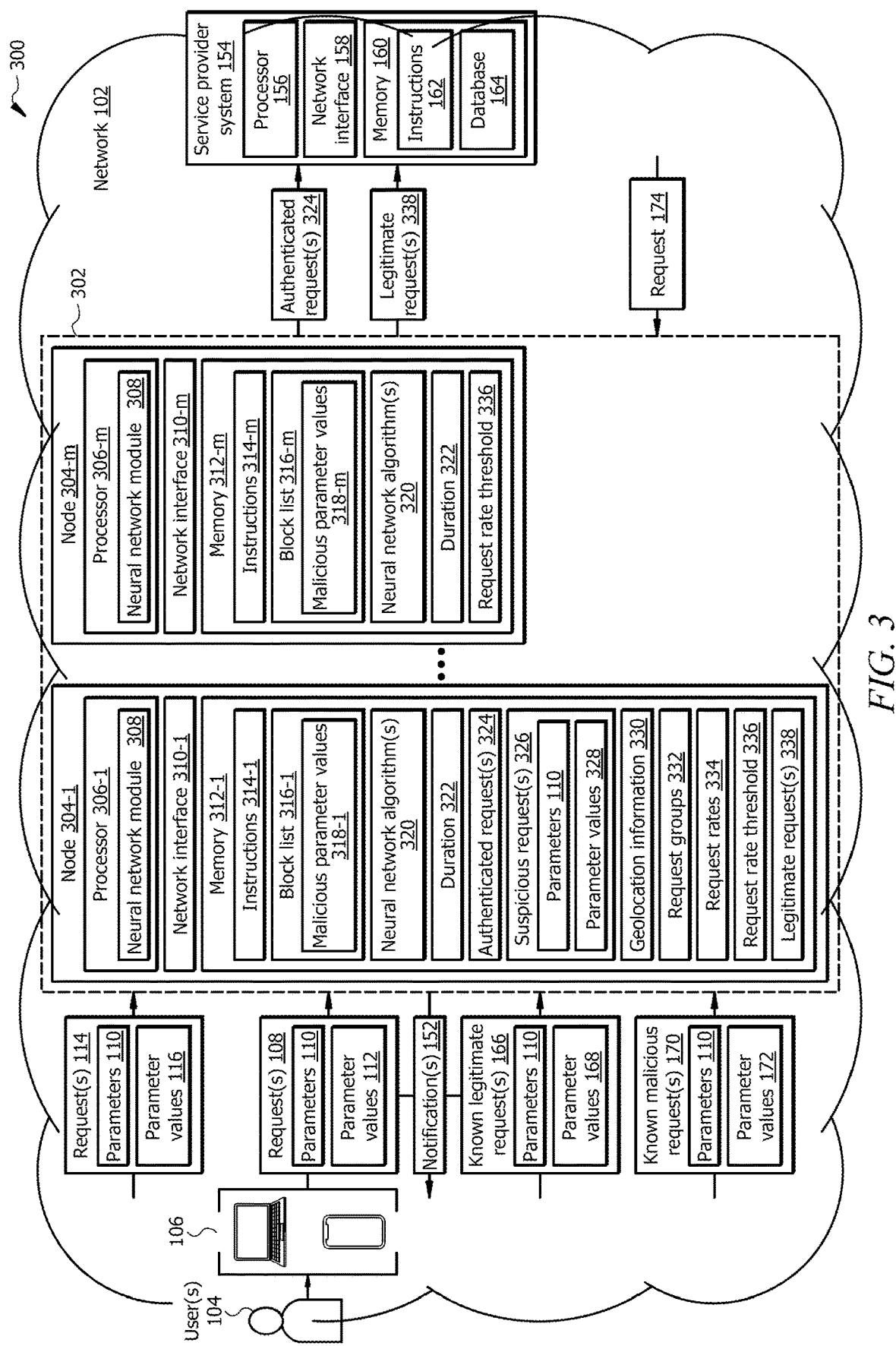
FIG. 3 illustrates an embodiment of a system configured for network intrusion detection using a neural network implemented by a cloud computing system.
Figure 4A:
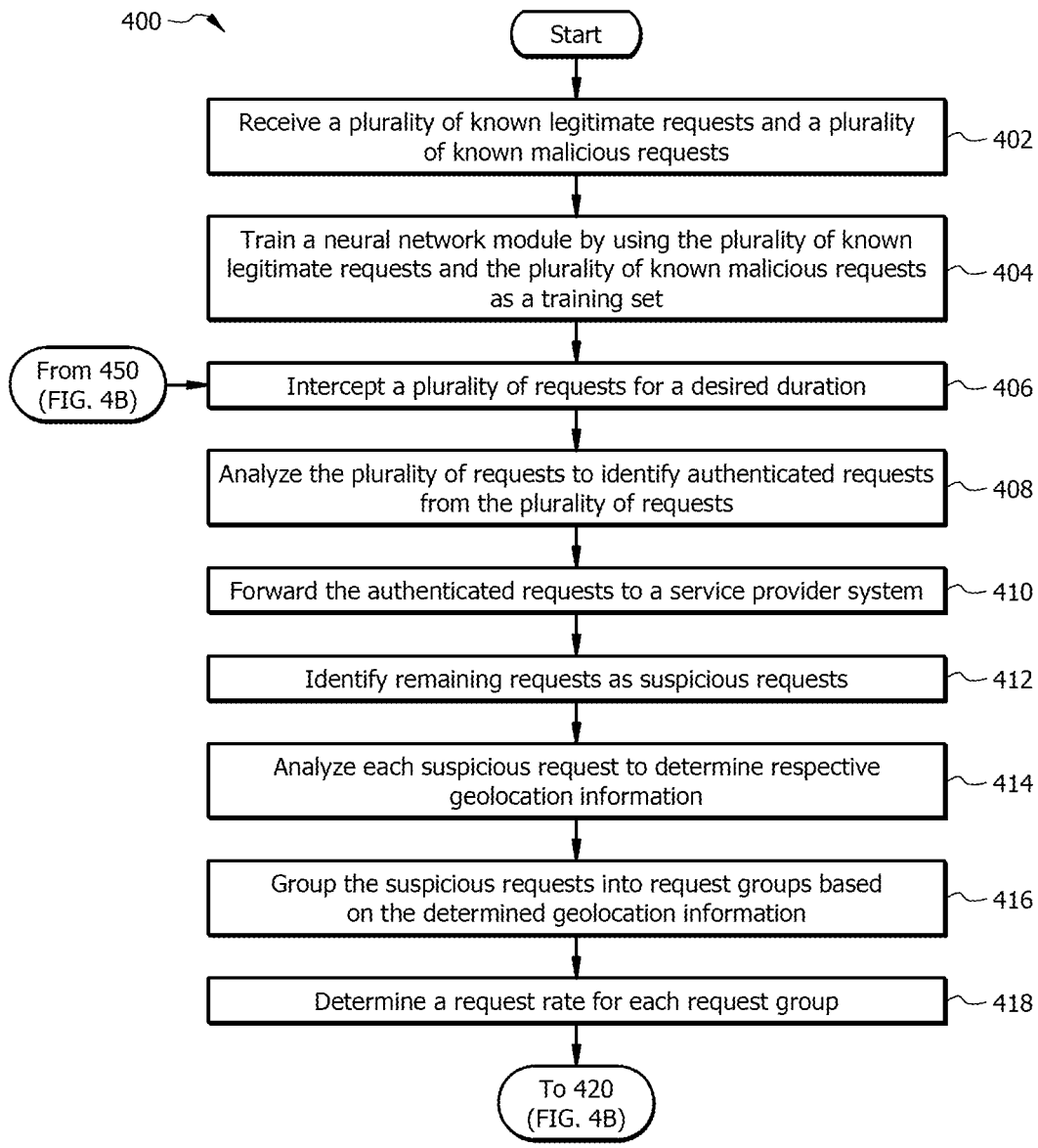
FIGS. 4A and 4B illustrate an example operational flow of the system of FIG. 3 for network intrusion detection using a neural network implemented by a cloud computing system.
Figure 4B:
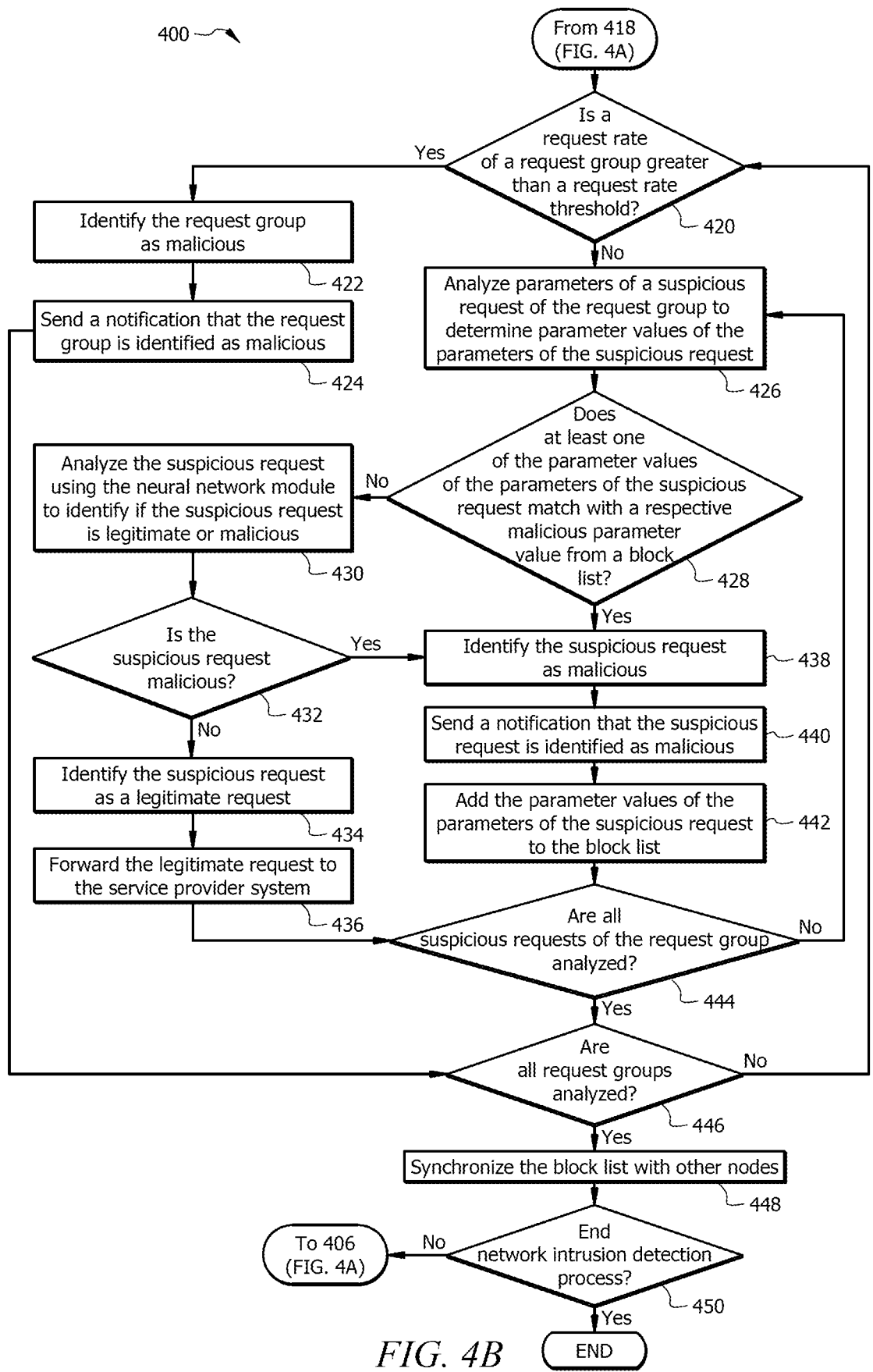

As described above, previous technologies fail to provide efficient and reliable solutions for the network security. Embodiments of the present disclosure and its advantages may be understood by referring to FIGS. 1, 2A, 2B, 3, 4A, and 4B. FIGS. 1, 2A, and 2B are used to describe a system and method for network intrusion detection using a neural network implemented by a local computing system. FIGS. 3, 4A, and 4B are used to describe a system and method for network intrusion detection using a neural network implemented by a cloud computing system.

System for Network Intrusion Detection Using a Neural Network Implemented by a Local Computing System System Overview FIG. 1 illustrates an embodiment of a system 100 that is generally configured for network intrusion detection using a neural network implemented by a local computing system. In certain embodiments, the system 100 comprises a network intrusion detection system 118 that is operably coupled to one or more user devices 106 of one or more users 104 and a service provider system 154 via a network 102. Network 102 enables the communication between the components of the system 100. The service provider system 154 is configured to received one or more requests from users and provide respective services to the users based on the requests. The service provider system 154 may comprise a data storage system, a web hosting system, a cloud computing system hosting micro application, or any other computing system configured to provide desired services to users. In the illustrated embodiment, the network intrusion detection system 118 is a local computing system or a stand-alone computing system that is configured to implement a neural network module 122. In other embodiments, the system 100 may not have all the components listed and/or may have other elements instead of, or in addition to, those listed above. For example, the network intrusion detection system 118 may be integrated into the service provider system 154.

In general, network intrusion detection system 118 intercepts a plurality of requests (e.g., requests 108 and/or 114) directed to service provider system 154 for a desired duration 132, analyzes the requests (e.g., requests 108 and/or 114) to identify authenticated requests 134 from the requests (e.g., requests 108 and/or 114), and forwards authenticated requests 134 to service provider system 154 for further processing.

Network intrusion detection system 118 identifies remaining ones of requests (e.g., requests 108 and/or 114) as suspicious requests 136 and analyzes each of suspicious requests 136 to determine respective geolocation information 140. Each of suspicious requests 136 comprises parameters 110 and respective parameters values 138.

Network intrusion detection system 118 groups suspicious requests 136 into request groups 142 based on the determined geolocation information 140, determines a request rate 144 for each of request groups 142, and determines if a request rate 144 of a request group (e.g., respective one of request groups 142) is greater than a request rate threshold 146.

In response to determining that request rate 144 of the request group (e.g., respective one of request groups 142) is greater than request rate threshold 146, network intrusion detection system 118 identifies the request group (e.g., respective one of request groups 142) as malicious and sends a notification 152 that the request group (e.g., respective one of request groups 142) is identified as malicious.

In response to determining that request rate 144 of the request group (e.g., respective one of request groups 142) is less than or equal to request rate threshold 146, network intrusion detection system 118 analyzes parameters 110 of a suspicious request (e.g., respective one of suspicious requests 136) of the request group (e.g., respective one of request groups 142) to determine parameter values 138 of parameters 110 of the suspicious request (e.g., respective one of suspicious requests 136).

Processor 120 of network intrusion detection system 118 determines if parameter values 138 of parameters 110 of the suspicious request (e.g., respective one of suspicious requests 136) are within respective acceptable parameter value ranges 148. In response to determining that parameter values 138 of parameters 110 of the suspicious request (e.g., respective one of suspicious requests 136) are not within respective acceptable parameter value ranges 148, network intrusion detection system 118 analyzes the suspicious request (e.g., respective one of suspicious requests 136) using neural network module 122 to identify if the suspicious request (e.g., respective one of suspicious requests 136) is legitimate or malicious.

Network intrusion detection system 118 determines if the suspicious request (e.g., respective one of suspicious requests 136) is a legitimate request 150. In response to determining that the suspicious request (e.g., respective one of suspicious requests 136) is legitimate request 150, network intrusion detection system 118 updates acceptable parameter value ranges 148 based on parameter values 138 of parameters 110 of the suspicious request (e.g., respective one of suspicious requests 136).

In response to determining that the suspicious request (e.g., respective one of suspicious requests 136) is not a legitimate request 150, network intrusion detection system 118 sends a notification 152 that the suspicious request (e.g., respective one of suspicious requests 136) is identified as malicious.

In response to determining that parameter values 138 of parameters 110 of the suspicious request (e.g., respective one of suspicious requests 136) are within respective acceptable parameter value ranges 148, network intrusion detection system 118 identifies the suspicious request (e.g., respective one of suspicious requests 136) as a legitimate request 150 and forwards legitimate request 150 to service provider system 154 for further processing.

Network intrusion detection system 118 performs the above-described operations for all suspicious requests (e.g., suspicious requests 136) of all request groups (e.g., request groups 142). Network intrusion detection system 118 determines if a request 174 to end the network intrusion detection process is received. Network intrusion detection system 118 performs the above-described operations until the request 174 to end the network intrusion detection process is received.

By providing notifications 152 to a network administrator, network intrusion detection system 118 allows for early detection of network intrusions such as, for example, distributed denial-of-service (DDOS) attacks. By preventing malicious requests from reaching service provider system 154, the network intrusion detection system 118 prevents network intrusions. This in turn improves network security of the service provider system 154.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

User Device

The user device 106 is generally any device that is configured to process data and interact with the user 104. Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, keypad, or other appropriate terminal equipment usable by the user 104. The user device 106 may include a hardware processor, memory, and/or circuitry (not explicitly shown) configured to perform any of the functions or actions of the user device 106 described herein. For example, software applications designed using software code may be stored in the memory and executed by the processor to perform the functions of the user device 106. The user device 106 is configured to communicate with other components of the system 100 via the network 102.

In operation, user device 106 of user 104 sends requests 108 to service provider system 154 that are intercepted by network intrusion detection system 118. In certain embodiments when user 104 is an authenticated user, requests 108 are identified as authenticated requests 134. Network intrusion detection system 118 forwards authenticated requests 134 to service provider system 154 for further processing. In other embodiments when user 104 is a malicious user, requests 108 are identified as malicious. Network intrusion detection system 118 does not forward requests 108 that are identified as malicious to service provider system 154.

Network Intrusion Detection System

The network intrusion detection system 118 is generally any device that is configured to process data and communicate with other components of the system 100 via the network 102. The network intrusion detection system 118 may comprise a processor 120 in signal communication with a memory 126 and a network interface 124.

Processor 120 comprises one or more processors operably coupled to the memory 126. Processor 120 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 120 may be a programmable logic device, a microcontroller, a microprocessor, or any suitable combination of the preceding. The one or more processors are configured to process data and may be implemented in hardware or software. For example, processor 120 may be 8-bit, 16-bit, 32-bit, 64-bit, or of any other suitable architecture. The one or more processors are configured to implement various software instructions to perform the operations described herein. For example, the one or more processors are configured to execute software instructions 128 and perform one or more functions described herein. In certain embodiments, processor 120 is further configured to execute one or more neural network algorithms 130 and implement a neural network module 122.

Network interface 124 is configured to enable wired and/or wireless communications (e.g., via network 102). Network interface 124 is configured to communicate data between the network intrusion detection system 118 and other components of the system 100. For example, network interface 124 may comprise a WIFI interface, a local area network (LAN) interface, a wide area network (WAN) interface, a modem, a switch, or a router. Processor 120 is configured to send and receive data using network interface 124. Network interface 124 may be configured to use any suitable type of communication protocol as would be appreciated by one of ordinary skill in the art.

Memory 126 comprises a non-transitory computer-readable medium such as one or more disks, tape drives, or solid-state drives, and may be used as an over-flow data storage device, to store programs when such programs are selected for execution, and to store instructions and data that are read during program execution. Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 may store any of the information described in FIGS. 1, 2A, and 2B along with any other data, instructions, logic, rules, or code operable to implement the function(s) described herein. Memory 126 is operable to store software instructions 128, one or more neural network algorithms 130, and/or any other data and instructions. Software instructions 128 may comprise any suitable set of software instructions, logic, rules, or code operable to be executed by processor 120. One or more neural network algorithms 130 may comprise a Hoeffding tree algorithm, a Hoeffding adaptive tree algorithm, an extremely fast decision tree algorithm, a Kohonen network algorithm, or other suitable algorithms. One or more neural network algorithms 130 when executed by processor 120, cause processor 120 to implement neural network module 122.

In operation, processor 120 of network intrusion detection system 118 receives a plurality of known legitimate requests 166 and a plurality of known malicious requests 170. Known legitimate requests 166 comprise requests that originate from legitimate users, such as authenticated users, for example. Known malicious requests 170 comprise requests that originate from malicious users. Each of known legitimate requests 166 comprises parameters 110 and respective parameter values 168. Each of known malicious requests 170 comprises parameters 110 and respective parameter values 172. In certain embodiments, known legitimate requests 166 and known malicious requests 170 are network packets, such as TCP/IP packets. In such embodiments, parameters 110 are TCP/IP packet parameters.

Processor 120 of network intrusion detection system 118 trains neural network module 122 by using known legitimate requests 166 and known malicious requests 170 as a training set. In certain embodiments, the training process comprises executing one or more neural network algorithms 130. In certain embodiments, the training process may also determine respective acceptable parameter value ranges 148 based on parameter values 168 of parameters 110 of known legitimate requests 166.

Processor 120 of network intrusion detection system 118 intercepts a plurality of requests (e.g., requests 108 and/or 114) directed to service provider system 154 for a desired duration 132. Each request comprises a request for a service from the service provider system 154. In certain embodiments, requests 108 and 114 are network packets, such as TCP/IP packets. In such embodiments, parameters 110 are TCP/IP packet parameters.

Processor 120 of network intrusion detection system 118 analyzes the requests (e.g., requests 108 and/or 114) to identify authenticated requests 134 from the requests (e.g., requests 108 and/or 114). In certain embodiments when user 104 is an authenticated user of service provider system 154, authenticated requests 134 comprise requests 108 originated from user device 106 of user 104. In other embodiments when user 104 is a malicious user, authenticated requests 134 may comprise one or more of requests 114. Processor 120 of network intrusion detection system 118 forwards authenticated requests 134 to service provider system 154 for further processing.

Processor 120 of network intrusion detection system 118 identifies remaining ones of requests (e.g., requests 108 and/or 114) as suspicious requests 136. Each of suspicious requests 136 comprises parameters 110 and respective parameters values 138. Processor 120 of network intrusion detection system 118 analyzes each of suspicious requests 136 to determine respective geolocation information 140. Each geolocation information 140 comprises an information for a location from which a respective one of suspicious requests 136 originates. For example, geolocation information 140 may comprise an IP address, or other information that identifies the location.

Processor 120 of network intrusion detection system 118 groups suspicious requests 136 into request groups 142 based on the determined geolocation information 140. Each of request groups 142 is associated with a respective geolocation information and comprises a subset of suspicious requests 136 associated with the respective geolocation information. For example, the subset of suspicious requests 136 are requests that either originate from a same IP address or originate from different IP addresses that are geographically proximate to each other.

Processor 120 of network intrusion detection system 118 determines a request rate 144 for each of request groups 142. Processor 120 of network intrusion detection system 118 determines if a request rate 144 of a request group (e.g., respective one of request groups 142) is greater than a request rate threshold 146.

In response to determining that request rate 144 of the request group (e.g., respective one of request groups 142) is greater than request rate threshold 146, processor 120 of network intrusion detection system 118 identifies the request group (e.g., respective one of request groups 142) as malicious and sends a notification 152 that the request group (e.g., respective one of request groups 142) is identified as malicious. In certain embodiments, processor 120 of network intrusion detection system 118 sends the notification 152 to a device of a network administrator.

In response to determining that request rate 144 of the request group (e.g., respective one of request groups 142) is less than or equal to request rate threshold 146, processor 120 of network intrusion detection system 118 analyzes parameters 110 of a suspicious request (e.g., respective one of suspicious requests 136) of the request group (e.g., respective one of request groups 142) to determine parameter values 138 of parameters 110 of the suspicious request (e.g., respective one of suspicious requests 136).

Processor 120 of network intrusion detection system 118 determines if parameter values 138 of parameters 110 of the suspicious request (e.g., respective one of suspicious requests 136) are within respective acceptable parameter value ranges 148. In response to determining that parameter values 138 of parameters 110 of the suspicious request (e.g., respective one of suspicious requests 136) are not within respective acceptable parameter value ranges 148, processor 120 of network intrusion detection system 118 analyzes the suspicious request (e.g., respective one of suspicious requests 136) using neural network module 122 to identify if the suspicious request (e.g., respective one of suspicious requests 136) is legitimate or malicious.

Processor 120 of network intrusion detection system 118 determines if the suspicious request (e.g., respective one of suspicious requests 136) is a legitimate request 150. In response to determining that the suspicious request (e.g., respective one of suspicious requests 136) is legitimate request 150, processor 120 of network intrusion detection system 118 updates acceptable parameter value ranges 148 based on parameter values 138 of parameters 110 of the suspicious request (e.g., respective one of suspicious requests 136).

In response to determining that the suspicious request (e.g., respective one of suspicious requests 136) is not a legitimate request 150, processor 120 of network intrusion detection system 118 sends a notification 152 that the suspicious request (e.g., respective one of suspicious requests 136) is identified as malicious. In certain embodiments, processor 120 of network intrusion detection system 118 sends the notification 152 to a device of a network administrator.

In response to determining that parameter values 138 of parameters 110 of the suspicious request (e.g., respective one of suspicious requests 136) are within respective acceptable parameter value ranges 148, processor 120 of network intrusion detection system 118 identifies the suspicious request (e.g., respective one of suspicious requests 136) as a legitimate request 150 and forwards legitimate request 150 to service provider system 154.

Processor 120 of network intrusion detection system 118 performs the above-described operations for all suspicious requests (e.g., suspicious requests 136) of all request groups (e.g., request groups 142). Processor 120 of network intrusion detection system 118 determines if a request 174 to end the network intrusion detection process is received. In certain embodiments, the request 174 to end the network intrusion detection process may be received from a device of a network administrator. Processor 120 of network intrusion detection system 118 performs the above-described operations until the request 174 to end the network intrusion detection process is received.

Service Provider System

The service provider system 154 is generally any device that is configured to process data and communicate with other components of system 100 via network 102. In the illustrated embodiment, service provider system 154 comprises a data storage system. In other embodiments, service provider system 154 may comprise a web hosting system, a cloud computing system hosting micro application, or any other computing system configured to provide desired services to users. Service provider system 154 may comprise a processor 156 in signal communication with a memory 160 and a network interface 158.

Processor 156 comprises one or more processors operably coupled to memory 160. Processor 156 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 156 may be a programmable logic device, a microcontroller, a microprocessor, or any suitable combination of the preceding. The one or more processors are configured to process data and may be implemented in hardware or software. For example, processor 156 may be 8-bit, 16-bit, 32-bit, 64-bit, or of any other suitable architecture. The one or more processors are configured to implement various software instructions to perform the operations described herein. For example, the one or more processors are configured to execute software instructions 162 and perform one or more functions described herein.

Network interface 158 is configured to enable wired and/or wireless communications (e.g., via network 102). Network interface 158 is configured to communicate data between service provider system 154 and other components of system 100. For example, network interface 158 may comprise a WIFI interface, a local area network (LAN) interface, a wide area network (WAN) interface, a modem, a switch, or a router. Processor 156 is configured to send and receive data using network interface 158. Network interface 158 may be configured to use any suitable type of communication protocol as would be appreciated by one of ordinary skill in the art.

Memory 160 comprises a non-transitory computer-readable medium such as one or more disks, tape drives, or solid-state drives, and may be used as an over-flow data storage device, to store programs when such programs are selected for execution, and to store instructions and data that are read during program execution. Memory 160 may be volatile or non-volatile and may comprise a read-only memory (ROM), random-access memory (RAM), ternary content-addressable memory (TCAM), dynamic random-access memory (DRAM), and static random-access memory (SRAM). Memory 160 may be implemented using one or more disks, tape drives, solid-state drives, and/or the like. Memory 160 may store any of the information described in FIGS. 1, 2A, and 2B along with any other data, instructions, logic, rules, or code operable to implement the function(s) described herein. Memory 160 is operable to store software instructions 162 and/or any other data and instructions. Software instructions 162 may comprise any suitable set of software instructions, logic, rules, or code operable to be executed by processor 120. Memory 160 may be further operable to store a database 164 that comprises various data items used by service provider system 154 to provide desired services to users.

In operation, processor 156 of service provider system 154 receives authenticated requests 134 and legitimate requests 150 from network intrusion detection system 118. Network intrusion detection system 118 prevents suspicious requests 136 that have been identified as malicious from reaching service provider system 154.

Example Method for Network Intrusion Detection Using a Neural Network Implemented by a Local Computing System FIGS. 2A and 2B illustrate an example flowchart of a method 200 for network intrusion detection using a neural network implemented by a local computing system. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., instructions 128, 162, and/or one or more neural network algorithms 130 of FIG. 1), stored on non-transitory, tangible, computer-readable medium (e.g., memories 126 and/or 160 of FIG. 1) that when executed by one or more processors (e.g., processors 120 and/or 156 of FIG. 1) may cause the one or more processors to perform operations 202-246.

Method 200 starts with operation 202, where processor 120 of network intrusion detection system 118 receives a plurality of known legitimate requests 166 and a plurality of known malicious requests 170. Known legitimate requests 166 comprise requests that originate from legitimate users, such as authenticated users, for example. Known malicious requests 170 comprise requests that originate from malicious users. Each of known legitimate requests 166 comprises parameters 110 and respective parameter values 168. Each of known malicious requests 170 comprises parameters 110 and respective parameter values 172. In certain embodiments, known legitimate requests 166 and known malicious requests 170 are network packets, such as TCP/IP packets. In such embodiments, parameters 110 are TCP/IP packet parameters.

At operation 204, processor 120 of network intrusion detection system 118 trains neural network module 122 by using known legitimate requests 166 and known malicious requests 170 as a training set. In certain embodiments, the training process comprises executing one or more neural network algorithms 130. One or more neural network algorithms 130 may comprise a Hoeffding tree algorithm, a Hoeffding adaptive tree algorithm, an extremely fast decision tree algorithm, a Kohonen network algorithm, or other suitable algorithms. In certain embodiments, the training process may also determine respective acceptable parameter value ranges 148 based on parameter values 168 of parameters 110 of known legitimate requests 166.

At operation 206, processor 120 of network intrusion detection system 118 intercepts a plurality of requests (e.g., requests 108 and/or 114 of FIG. 1) directed to service provider system 154 for a desired duration 132. Each request comprises a request for a service from the service provider system 154. In certain embodiments, requests 108 and 114 are network packets, such as TCP/IP packets. In such embodiments, parameters 110 are TCP/IP packet parameters.

At operation 208, processor 120 of network intrusion detection system 118 analyzes the requests (e.g., requests 108 and/or 114 of FIG. 1) to identify authenticated requests 134 from the requests (e.g., requests 108 and/or 114 of FIG. 1). In certain embodiments when user 104 is an authenticated user of service provider system 154, authenticated requests 134 comprise requests 108 originated from user device 106 of user 104. In other embodiments when user 104 is a malicious user, authenticated requests 134 may comprise one or more of requests 114.

At operation 210, processor 120 of network intrusion detection system 118 forwards authenticated requests 134 to service provider system 154 for further processing.

At operation 212, processor 120 of network intrusion detection system 118 identifies remaining ones of requests (e.g., requests 108 and/or 114 of FIG. 1) as suspicious requests 136. Each of suspicious requests 136 comprises parameters 110 and respective parameters values 138.

At operation 214, processor 120 of network intrusion detection system 118 analyzes each of suspicious requests 136 to determine respective geolocation information 140. Each geolocation information 140 comprises an information for a location from which a respective one of suspicious requests 136 originates. For example, geolocation information 140 may comprise an IP address, or other information that identifies the location.

At operation 216, processor 120 of network intrusion detection system 118 groups suspicious requests 136 into request groups 142 based on the determined geolocation information 140. Each of request groups 142 is associated with a respective geolocation information and comprises a subset of suspicious requests 136 associated with the respective geolocation information. For example, the subset of suspicious requests 136 are requests that either originate from a same IP address or originate from different IP addresses that are geographically proximate to each other.

At operation 218, processor 120 of network intrusion detection system 118 determines a request rate 144 for each of request groups 142.

At operation 220, processor 120 of network intrusion detection system 118 determines if a request rate 144 of a request group (e.g., respective one of request groups 142 of FIG. 1) is greater than a request rate threshold 146.

In response to determining at operation 220 that request rate 144 of the request group (e.g., respective one of request groups 142 of FIG. 1) is greater than request rate threshold 146, method 200 continues to operation 222. At operation 222, processor 120 of network intrusion detection system 118 identifies the request group (e.g., respective one of request groups 142 of FIG. 1) as malicious.

At operation 224, processor 120 of network intrusion detection system 118 sends a notification 152 that the request group (e.g., respective one of request groups 142 of FIG. 1) is identified as malicious. In certain embodiments, processor 120 of network intrusion detection system 118 sends the notification 152 to a device of a network administrator. After performing operation 224, method 200 continues to operation 244.

In response to determining at operation 220 that request rate 144 of the request group (e.g., respective one of request groups 142 of FIG. 1) is less than or equal to request rate threshold 146, method 200 continues to operation 226. At operation 226, processor 120 of network intrusion detection system 118 analyzes parameters 110 of a suspicious request (e.g., respective one of suspicious requests 136 of FIG. 1) of the request group (e.g., respective one of request groups 142 of FIG. 1) to determine parameter values 138 of parameters 110 of the suspicious request (e.g., respective one of suspicious requests 136 of FIG. 1).

At operation 228, processor 120 of network intrusion detection system 118 determines if parameter values 138 of parameters 110 of the suspicious request (e.g., respective one of suspicious requests 136 of FIG. 1) are within respective acceptable parameter value ranges 148.

In response to determining at operation 228 that parameter values 138 of parameters 110 of the suspicious request (e.g., respective one of suspicious requests 136 of FIG. 1) are not within respective acceptable parameter value ranges 148, method 200 continues to operation 230. At operation 230, processor 120 of network intrusion detection system 118 analyzes the suspicious request (e.g., respective one of suspicious requests 136 of FIG. 1) using neural network module 122 to identify if the suspicious request (e.g., respective one of suspicious requests 136 of FIG. 1) is legitimate or malicious.

At operation 232, processor 120 of network intrusion detection system 118 determines if the suspicious request (e.g., respective one of suspicious requests 136 of FIG. 1) is a legitimate request 150.

In response to determining at operation 232 that the suspicious request (e.g., respective one of suspicious requests 136 of FIG. 1) is legitimate request 150, method 200 continues to operation 234. At operation 234, processor 120 of network intrusion detection system 118 updates acceptable parameter value ranges 148 based on parameter values 138 of parameters 110 of the suspicious request (e.g., respective one of suspicious requests 136 of FIG. 1). After performing operation 234, method 200 continues to operation 238.

In response to determining at operation 232 that the suspicious request (e.g., respective one of suspicious requests 136 of FIG. 1) is not a legitimate request 150, method 200 continues to operation 236. At operation 236, processor 120 of network intrusion detection system 118 sends a notification 152 that the suspicious request (e.g., respective one of suspicious requests 136 of FIG. 1) is identified as malicious. In certain embodiments, processor 120 of network intrusion detection system 118 sends the notification 152 to a device of a network administrator. After performing operation 236, method 200 continues to operation 242.

In response to determining at operation 228 that parameter values 138 of parameters 110 of the suspicious request (e.g., respective one of suspicious requests 136 of FIG. 1) are within respective acceptable parameter value ranges 148 or after performing operation 234, method 200 continues to operation 238. At operation 238, processor 120 of network intrusion detection system 118 identifies the suspicious request (e.g., respective one of suspicious requests 136 of FIG. 1) as a legitimate request 150.

At operation 240, processor 120 of network intrusion detection system 118 forwards legitimate request 150 to service provider system 154.

After performing operations 236 or 240, method 200 continues to operation 242. At operation 242, processor 120 of network intrusion detection system 118 determines if all suspicious requests (e.g., respective ones of suspicious requests 136 of FIG. 1) of the request group (e.g., respective one of request groups 142 of FIG. 1) are analyzed.

In response to determining at operation 242 that all suspicious requests (e.g., respective ones of suspicious requests 136 of FIG. 1) of the request group (e.g., respective one of request groups 142 of FIG. 1) are not analyzed, method 200 continues to operation 226. In certain embodiments, operations 226 through 242 are performed one or more times until all suspicious requests (e.g., respective ones of suspicious requests 136 of FIG. 1) of the request group (e.g., respective one of request groups 142 of FIG. 1) are analyzed.

In response to determining at operation 242 that all suspicious requests (e.g., respective ones of suspicious requests 136 of FIG. 1) of the request group (e.g., respective one of request groups 142 of FIG. 1) are analyzed or after performing operation 224, method 200 continues to operation 244. At operation 244, processor 120 of network intrusion detection system 118 determines if all request groups (e.g., request groups 142 of FIG. 1) are analyzed.

In response to determining at operation 244 that all request groups (e.g., request groups 142 of FIG. 1) are not analyzed, method 200 continues to operation 220. In certain embodiments, operations 220 through 244 are performed one or more times until all request groups (e.g., request groups 142 of FIG. 1) are analyzed.

In response to determining at operation 244 that all request groups (e.g., request groups 142 of FIG. 1) are analyzed, method 200 continues to operation 246. At operation 246, processor 120 of network intrusion detection system 118 determines if a request 174 to end the network intrusion detection process is received. In certain embodiments, the request 174 to end the network intrusion detection process may be received from a device of a network administrator.

In response to determining at operation 246 that the request 174 to end the network intrusion detection process is not received, method 200 continues to operation 206. In certain embodiments, operations 206 through 246 are performed one or more times until the request 174 to end the network intrusion detection process is received. In response to determining at operation 246 that the request 174 to end the network intrusion detection process is received, method 200 ends.

System for Network Intrusion Detection Using a Neural Network Implemented by a Cloud Computing System System Overview FIG. 3 illustrates an embodiment of a system 300 that is generally configured for network intrusion detection using a neural network implemented by a cloud computing system. In certain embodiments, the system 300 comprises a network intrusion detection system 302 that is operably coupled to one or more user devices 106 of one or more users 104 and a service provider system 154 via a network 102. Network 102 enables the communication between the components of the system 300. The service provider system 154 is configured to receive one or more requests from users and provide respective services based on the requests. The service provider system 154 may comprise a data storage system, a web hosting system, a cloud computing system hosting micro application, or any other computing system configured to provide desired services to users. In the illustrated embodiment, the network intrusion detection system 302 is a cloud computing system comprising a plurality of nodes 304-1 through 304-m, where each of the nodes 304-1 through 304-m is configured to implement a neural network module 308. In certain embodiments, each of the nodes 304-1 through 304-m is configured to intercept a plurality of requests directed to service provider system 154 from a respective geographical region. Furthermore, even if one or more nodes of network intrusion detection system 302 are down, the requests may be redirected to operating nodes of network intrusion detection system 302. In other embodiments, system 300 may not have all the components listed and/or may have other elements instead of, or in addition to, those listed above.

In general, a node (e.g., node 304-1) of network intrusion detection system 302 intercepts a plurality of requests (e.g., requests 108 and/or 114) directed to service provider system 154 from a respective geographical region for a desired duration 322, analyzes the requests (e.g., requests 108 and/or 114) to identify authenticated requests 324 from the requests (e.g., requests 108 and/or 114), and forwards authenticated requests 324 to service provider system 154 for further processing.

The node (e.g., node 304-1) of network intrusion detection system 302 identifies remaining ones of requests (e.g., requests 108 and/or 114) as suspicious requests 326. Each of suspicious requests 326 comprises parameters 110 and respective parameters values 328. The node (e.g., node 304-1) of network intrusion detection system 302 analyzes each of suspicious requests 326 to determine respective geolocation information 330 and groups suspicious requests 326 into request groups 332 based on the determined geolocation information 330.

The node (e.g., node 304-1) of network intrusion detection system 302 determines a request rate 334 for each of request groups 332 and determines if a request rate 334 of a request group (e.g., respective one of request groups 332) is greater than a request rate threshold 336. In response to determining that request rate 334 of the request group (e.g., respective one of request groups 332) is greater than request rate threshold 336, the node (e.g., node 304-1) of network intrusion detection system 302 identifies the request group (e.g., respective one of request groups 332) as malicious and sends a notification 152 that the request group (e.g., respective one of request groups 332) is identified as malicious.

In response to determining that request rate 334 of the request group (e.g., respective one of request groups 332) is less than or equal to request rate threshold 336, the node (e.g., node 304-1) of network intrusion detection system 302 analyzes parameters 110 of a suspicious request (e.g., respective one of suspicious requests 326) of the request group (e.g., respective one of request groups 332) to determine parameter values 328 of parameters 110 of the suspicious request (e.g., respective one of suspicious requests 326) and determines if at least one of parameter values 328 of parameters 110 of the suspicious request (e.g., respective one of suspicious requests 326) matches with a respective malicious parameter value (e.g., respective one of malicious parameter values) from a block list (e.g., block list 316-1) that is stored in the node (e.g., node 304-1) of network intrusion detection system 302.

In response to determining that parameter values 328 of parameters 110 of the suspicious request (e.g., respective one of suspicious requests 326) do not match with respective malicious parameter values (e.g., malicious parameter values 318-1), the node (e.g., node 304-1) of network intrusion detection system 302 analyzes the suspicious request (e.g., respective one of suspicious requests 326) using neural network module 308 to identify if the suspicious request (e.g., respective one of suspicious requests 326) is legitimate or malicious.

The node (e.g., node 304-1) of network intrusion detection system 302 determines if the suspicious request (e.g., respective one of suspicious requests 326) is malicious. In response to determining that the suspicious request (e.g., respective one of suspicious requests 326) is not malicious, the node (e.g., node) of network intrusion detection system 302 identifies the suspicious request (e.g., respective one of suspicious requests 326 of FIG. 3) as a legitimate request 338 and forwards legitimate request 338 to service provider system 154 for further processing.

In response to determining that at least one of parameter values 328 of parameters 110 of the suspicious request (e.g., respective one of suspicious requests 326) matches with a respective malicious parameter value (e.g., respective one of malicious parameter values 318-1), the node (e.g., node 304-1) of network intrusion detection system 302 identifies the suspicious request (e.g., respective one of suspicious requests 326) as malicious and sends a notification 152 that the suspicious request (e.g., respective one of suspicious requests 326) is identified as malicious.

The node (e.g., node 304-1) of network intrusion detection system 302 adds parameter values 328 of parameters 110 of the suspicious request (e.g., respective one of suspicious requests 326) to the block list (e.g., block list 316-1). The node (e.g., node 304-1) of network intrusion detection system 302 performs the above-described operations for all suspicious requests (e.g., suspicious requests 326) of all request groups (e.g., request groups 332).

The node (e.g., node 304-1) of network intrusion detection system 302 synchronizes that block list (e.g., block list 316-1) with block lists (e.g., rest of block lists 316-1 through 316-m) of other nodes (e.g., rest of nodes 304-1 through 304-m) of network intrusion detection system 302. The node (e.g., node 304-1) of network intrusion detection system 302 determines if a request 174 to end the network intrusion detection process is received and performs the above-described operations until the request 174 to end the network intrusion detection process is received.

By providing notifications 152 to a network administrator, network intrusion detection system 302 allows for early detection of network intrusions such as, for example, distributed denial-of-service (DDOS) attacks. By preventing malicious requests from reaching service provider system 154, the network intrusion detection system 302 prevents network intrusions. This in turn improves network security of the service provider system 154. Furthermore, even if one or more nodes of the network intrusion detection system 302 are down, intercepted requests may be redirected to operating nodes, which reduces or eliminated downtime of the network intrusion detection system 302.

Network

Network 102 has been described in detail with reference to FIG. 1 and the description is not repeated herein.

User Device

The user device 106 has been described in detail with reference to FIG. 1 and the description is not repeated herein. In operation, user device 106 of user 104 sends requests 108 to service provider system 154 that are intercepted by network intrusion detection system 302. In certain embodiments when user 104 is an authenticated user, requests 108 are identified as authenticated requests 324. Network intrusion detection system 302 forwards authenticated requests 324 to service provider system 154 for further processing. In other embodiments when user 104 is a malicious user, requests 108 are identified as malicious. Network intrusion detection system 302 does not forward requests 108 that are identified as malicious to service provider system 154.

Network Intrusion Detection System

The network intrusion detection system 302 is generally any device that is configured to process data and communicate with other components of the system 300 via the network 102. In the illustrated embodiment, the network intrusion detection system 302 is a cloud computing system comprising a plurality of nodes 304-1 through 304-$m$. Each of the nodes 304-1 through 304-$m$ is configured to implement a neural network module 308. Each of the nodes 304-1 through 304-$m$ is generally any device that is configured to process data and communicate with other components of the system 300 via the network 102. Each of the nodes 304-1 through 304-$m$ comprises a respective one of processors 306-1 through 306-$m$ in signal communication with a respective one of memories 312-1 through 312-$m$ and a respective one of network interfaces 310-1 through 310-$m$.

Each of processors 306-1 through 306-$m$ may comprise one or more processors operably coupled to a respective one of memories 312-1 through 312-$m$. Each of processors 306-1 through 306-$m$ is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of processors 306-1 through 306-$m$ may be a programmable logic device, a microcontroller, a microprocessor, or any suitable combination of the preceding. The one or more processors are configured to process data and may be implemented in hardware or software. For example, each of processors 306-1 through 306-$m$ may be 8-bit, 16-bit, 32-bit, 64-bit, or of any other suitable architecture. Each of processors 306-1 through 306-$m$ is configured to implement various software instructions. For example, each of processors 306-1 through 306-$m$ is configured to execute a respective one of software instructions 314-1 through 314-$m$ and one or more neural network algorithms 320 that are stored in a respective one of memories 312-1 through 312-$m$ in order to perform the operations described herein.

Each of network interfaces 310-1 through 310-$m$ is configured to enable wired and/or wireless communications (e.g., via network 102). Each of network interfaces 310-1 through 310-$m$ is configured to communicate data between a respective one of nodes 304-1 through 304-$m$ and other components of the system 300. For example, each of network interfaces 310-1 through 310-$m$ may comprise a WIFI interface, a local area network (LAN) interface, a wide area network (WAN) interface, a modem, a switch, or a router. Each of network interfaces 310-1 through 310-$m$ may be configured to use any suitable type of communication protocol as would be appreciated by one of ordinary skill in the art.

Each of memories 312-1 through 312-$m$ comprises a non-transitory computer-readable medium such as one or more disks, tape drives, or solid-state drives, and may be used as an over-flow data storage device, to store programs when such programs are selected for execution, and to store instructions and data that are read during program execution. Each of memories 312-1 through 312-$m$ may be volatile or non-volatile and may comprise a read-only memory (ROM), random-access memory (RAM), ternary content-addressable memory (TCAM), dynamic random-access memory (DRAM), and static random-access memory (SRAM). Each of memories 312-1 through 312-$m$ may be implemented using one or more disks, tape drives, solid-state drives, and/or the like. Each of memories 312-1 through 312-$m$ may store any of the information described in FIGS. 3, 4A, and 4B along with any other data, instructions, logic, rules, or code operable to implement the function(s) described herein. Each of memories 312-1 through 312-$m$ is operable to store a respective one of software instructions 314-1 through 314-$m$, one or more neural network algorithms 320, and/or any other data and instructions. Each of software instructions 314-1 through 314-$m$ may comprise any suitable set of software instructions, logic, rules, or code operable to be executed by a respective one of processors 306-1 through 306-$m$. One or more neural network algorithms 320 may comprise a Hoeffding tree algorithm, a Hoeffding adaptive tree algorithm, an extremely fast decision tree algorithm, a Kohonen network algorithm, or other suitable algorithms. One or more neural network algorithms 320 when executed by a respective one of processors 306-1 through 306-$m$, cause the respective one of processors 306-1 through 306-$m$ to implement neural network module 308.

In operation, a processor (e.g., processor 306-1) of a node (e.g., node 304-1) of network intrusion detection system 302 receives a plurality of known legitimate requests 166 and a plurality of known malicious requests 170. Known legitimate requests 166 comprise requests that originate from legitimate users, such as authenticated users, for example. Known malicious requests 170 comprise requests that originate from malicious users. Each of known legitimate requests 166 comprises parameters 110 and respective parameter values 168. Each of known malicious requests 170 comprises parameters 110 and respective parameter values 172. In certain embodiments, known legitimate requests 166 and known malicious requests 170 are network packets, such as TCP/IP packets. In such embodiments, parameters 110 are TCP/IP packet parameters.

The processor (e.g., processor 306-1) of the node (e.g., node 304-1) of network intrusion detection system 302 trains neural network module 308 by using known legitimate requests 166 and known malicious requests 170 as a training set. In certain embodiments, the training process comprises executing one or more neural network algorithms 320. In certain embodiments, the training process may also store parameter values 172 of parameters 110 of known malicious requests 170 as malicious parameter values (e.g., malicious parameter values 318-1) in a block list (e.g., block list 316-1) that is stored in a memory (e.g., memory 312-1) of the node (e.g., node) of network intrusion detection system 302.

The processor (e.g., processor 306-1) of the node (e.g., node 304-1) of network intrusion detection system 302 intercepts a plurality of requests (e.g., requests 108 and/or 114) directed to service provider system 154 from a respective geographical region for a desired duration 322. Each request comprises a request for a service from the service provider system 154. In certain embodiments, requests 108 and 114 are network packets, such as TCP/IP packets. In such embodiments, parameters 110 are TCP/IP packet parameters.

The processor (e.g., processor 306-1) of the node (e.g., node 304-1) of network intrusion detection system 302 analyzes the requests (e.g., requests 108 and/or 114) to identify authenticated requests 324 from the requests (e.g., requests 108 and/or 114). In certain embodiments when user 104 is an authenticated user of service provider system 154, authenticated requests 324 comprise requests 108 originated from user device 106 of user 104. In other embodiments when user 104 is a malicious user, authenticated requests 324 may comprise one or more of requests 114. The processor (e.g., processor 306-1) of the node (e.g., node 304-1) of network intrusion detection system 302 forwards authenticated requests 324 to service provider system 154 for further processing.

The processor (e.g., processor 306-1) of the node (e.g., node 304-1) of network intrusion detection system 302 identifies remaining ones of requests (e.g., requests 108 and/or 114) as suspicious requests 326. Each of suspicious requests 326 comprises parameters 110 and respective parameters values 328.

The processor (e.g., processor 306-1) of the node (e.g., node 304-1) of network intrusion detection system 302 analyzes each of suspicious requests 326 to determine respective geolocation information 330. Each geolocation information 330 comprises an information for a location from which a respective one of suspicious requests 326 originates. For example, geolocation information 330 may comprise an IP address, or other information that identifies the location.

The processor (e.g., processor 306-1) of the node (e.g., node 304-1) of network intrusion detection system 302 groups suspicious requests 326 into request groups 332 based on the determined geolocation information 330. Each of request groups 332 is associated with a respective geolocation information and comprises a subset of suspicious requests 326 associated with the respective geolocation information. For example, the subset of suspicious requests 326 are requests that either originate from a same IP address or originate from different IP addresses that are geographically proximate to each other.

The processor (e.g., processor 306-1) of the node (e.g., node 304-1) of network intrusion detection system 302 determines a request rate 334 for each of request groups 332 and determines if a request rate 334 of a request group (e.g., respective one of request groups 332) is greater than a request rate threshold 336.

In response to determining that request rate 334 of the request group (e.g., respective one of request groups 332) is greater than request rate threshold 336, the processor (e.g., processor 306-1) of the node (e.g., node 304-1) of network intrusion detection system 302 identifies the request group (e.g., respective one of request groups 332) as malicious and sends a notification 152 that the request group (e.g., respective one of request groups 332) is identified as malicious. In certain embodiments, the processor (e.g., processor 306-1) of the node (e.g., node 304-1) of network intrusion detection system 302 sends the notification 152 to a device of a network administrator.

In response to determining that request rate 334 of the request group (e.g., respective one of request groups 332) is less than or equal to request rate threshold 336, the processor (e.g., processor 306-1) of the node (e.g., node 304-1) of network intrusion detection system 302 analyzes parameters 110 of a suspicious request (e.g., respective one of suspicious requests 326) of the request group (e.g., respective one of request groups 332) to determine parameter values 328 of parameters 110 of the suspicious request (e.g., respective one of suspicious requests 326) and determines if at least one of parameter values 328 of parameters 110 of the suspicious request (e.g., respective one of suspicious requests 326) matches with a respective malicious parameter value (e.g., respective one of malicious parameter values) from a block list (e.g., block list 316-1) that is stored in the node (e.g., node 304-1) of network intrusion detection system 302.

In response to determining that parameter values 328 of parameters 110 of the suspicious request (e.g., respective one of suspicious requests 326) do not match with respective malicious parameter values (e.g., malicious parameter values 318-1), the processor (e.g., processor 306-1) of the node (e.g., node 304-1) of network intrusion detection system 302 analyzes the suspicious request (e.g., respective one of suspicious requests 326) using neural network module 308 to identify if the suspicious request (e.g., respective one of suspicious requests 326) is legitimate or malicious.

The processor (e.g., processor 306-1) of the node (e.g., node 304-1) of network intrusion detection system 302 determines if the suspicious request (e.g., respective one of suspicious requests 326) is malicious. In response to determining that the suspicious request (e.g., respective one of suspicious requests 326) is not malicious, the processor (e.g., processor 306-1) of the node (e.g., node) of network intrusion detection system 302 identifies the suspicious request (e.g., respective one of suspicious requests 326 of FIG. 3) as a legitimate request 338 and forwards legitimate request 338 to service provider system 154.

In response to determining that at least one of parameter values 328 of parameters 110 of the suspicious request (e.g., respective one of suspicious requests 326) matches with a respective malicious parameter value (e.g., respective one of malicious parameter values 318-1), the processor (e.g., processor 306-1) of the node (e.g., node 304-1) of network intrusion detection system 302 identifies the suspicious request (e.g., respective one of suspicious requests 326) as malicious and sends a notification 152 that the suspicious request (e.g., respective one of suspicious requests 326) is identified as malicious. In certain embodiments, the processor (e.g., processor 306-1) of the node (e.g., node 304-1) of network intrusion detection system 302 sends the notification 152 to a device of a network administrator.

The processor (e.g., processor 306-1) of the node (e.g., node 304-1) of network intrusion detection system 302 adds parameter values 328 of parameters 110 of the suspicious request (e.g., respective one of suspicious requests 326) to the block list (e.g., block list 316-1). The processor (e.g., processor 306-1) of the node (e.g., node 304-1) of network intrusion detection system 302 performs the above-described operations for all suspicious requests (e.g., suspicious requests 326) of all request groups (e.g., request groups 332).

The processor (e.g., processor 306-1) of the node (e.g., node 304-1) of network intrusion detection system 302 synchronizes that block list (e.g., block list 316-1) with block lists (e.g., rest of block lists 316-1 through 316-*m*) of other nodes (e.g., rest of nodes 304-1 through 304-*m*) of network intrusion detection system 302. The processor (e.g., processor 306-1) of the node (e.g., node 304-1) of network intrusion detection system 302 determines if a request 174 to end the network intrusion detection process is received. In certain embodiments, the request 174 to end the network intrusion detection process may be received from a device of a network administrator. The processor (e.g., processor 306-1) of the node (e.g., node 304-1) of network intrusion detection system 302 performs the above-described operations until the request 174 to end the network intrusion detection process is received.

Service Provider System

The service provider system 154 has been described in detail with reference to FIG. 1 and the description is not repeated herein. In operation, processor 156 of service provider system 154 receives authenticated requests 324 and legitimate requests 338 from network intrusion detection system 302. Network intrusion detection system 302 prevents suspicious requests 326 that have been identified as malicious from reaching service provider system 154.

Example Method for Network Intrusion Detection Using a Neural Network Implemented by a Cloud Computing System FIGS. 4A and 4B illustrate an example flowchart of a method 400 for network intrusion detection using a neural network implemented by a cloud computing system. Modifications, additions, or omissions may be made to method 400. Method 400 may include more, fewer, or other operations. For example, operations may be performed in parallel or in any suitable order. For example, one or more operations of method 400 may be implemented, at least in part, in the form of software instructions (e.g., instructions 314-1 through 314-m, 162, and/or one or more neural network algorithms 320 of FIG. 3), stored on non-transitory, tangible, computer-readable medium (e.g., memories 312-1 through 312-m and/or 160 of FIG. 3) that when executed by one or more processors (e.g., processors 306-1 through 306-m and/or 156 of FIG. 3) may cause the one or more processors to perform operations 402-450.

Method 400 starts with operation 402, where a processor (e.g., processor 306-1 of FIG. 3) of a node (e.g., node 304-1 of FIG. 3) of network intrusion detection system 302 receives a plurality of known legitimate requests 166 and a plurality of known malicious requests 170. Known legitimate requests 166 comprise requests that originate from legitimate users, such as authenticated users, for example. Known malicious requests 170 comprise requests that originate from malicious users. Each of known legitimate requests 166 comprises parameters 110 and respective parameter values 168. Each of known malicious requests 170 comprises parameters 110 and respective parameter values 172. In certain embodiments, known legitimate requests 166 and known malicious requests 170 are network packets, such as TCP/IP packets. In such embodiments, parameters 110 are TCP/IP packet parameters.

At operation 404, the processor (e.g., processor 306-1 of FIG. 3) of the node (e.g., node 304-1 of FIG. 3) of network intrusion detection system 302 trains neural network module 308 by using known legitimate requests 166 and known malicious requests 170 as a training set. In certain embodiments, the training process comprises executing one or more neural network algorithms 320. One or more neural network algorithms 320 may comprise a Hoeffding tree algorithm, a Hoeffding adaptive tree algorithm, an extremely fast decision tree algorithm, a Kohonen network algorithm, or other suitable algorithms. In certain embodiments, the training process may also store parameter values 172 of parameters 110 of known malicious requests 170 as malicious parameter values (e.g., malicious parameter values 318-1 of FIG. 3) in a block list (e.g., block list 316-1 of FIG. 3) that is stored in a memory (e.g., memory 312-1 of FIG. 3) of the node (e.g., node 304-1 of FIG. 3) of network intrusion detection system 302.

At operation 406, the processor (e.g., processor 306-1 of FIG. 3) of the node (e.g., node 304-1 of FIG. 3) of network intrusion detection system 302 intercepts a plurality of requests (e.g., requests 108 and/or 114 of FIG. 3) directed to service provider system 154 from a respective geographical region for a desired duration 322. Each request comprises a request for a service from the service provider system 154. In certain embodiments, requests 108 and 114 are network packets, such as TCP/IP packets. In such embodiments, parameters 110 are TCP/IP packet parameters.

At operation 408, the processor (e.g., processor 306-1 of FIG. 3) of the node (e.g., node 304-1 of FIG. 3) of network intrusion detection system 302 analyzes the requests (e.g., requests 108 and/or 114 of FIG. 3) to identify authenticated requests 324 from the requests (e.g., requests 108 and/or 114 of FIG. 3). In certain embodiments when user 104 is an authenticated user of service provider system 154, authenticated requests 324 comprise requests 108 originated from user device 106 of user 104. In other embodiments when user 104 is a malicious user, authenticated requests 324 may comprise one or more of requests 114.

At operation 410, the processor (e.g., processor 306-1 of FIG. 3) of the node (e.g., node 304-1 of FIG. 3) of network intrusion detection system 302 forwards authenticated requests 324 to service provider system 154 for further processing.

At operation 412, the processor (e.g., processor 306-1 of FIG. 3) of the node (e.g., node 304-1 of FIG. 3) of network intrusion detection system 302 identifies remaining ones of requests (e.g., requests 108 and/or 114 of FIG. 3) as suspicious requests 326. Each of suspicious requests 326 comprises parameters 110 and respective parameters values 328.

At operation 414, the processor (e.g., processor 306-1 of FIG. 3) of the node (e.g., node 304-1 of FIG. 3) of network intrusion detection system 302 analyzes each of suspicious requests 326 to determine respective geolocation information 330. Each geolocation information 330 comprises an information for a location from which a respective one of suspicious requests 326 originates. For example, geolocation information 330 may comprise an IP address, or other information that identifies the location.

At operation 416, the processor (e.g., processor 306-1 of FIG. 3) of the node (e.g., node 304-1 of FIG. 3) of network intrusion detection system 302 groups suspicious requests 326 into request groups 332 based on the determined geolocation information 330. Each of request groups 332 is associated with a respective geolocation information and comprises a subset of suspicious requests 326 associated with the respective geolocation information. For example, the subset of suspicious requests 326 are requests that either originate from a same IP address or originate from different IP addresses that are geographically proximate to each other.

At operation 418, the processor (e.g., processor 306-1 of FIG. 3) of the node (e.g., node 304-1 of FIG. 3) of network intrusion detection system 302 determines a request rate 334 for each of request groups 332.

At operation 420, the processor (e.g., processor 306-1 of FIG. 3) of the node (e.g., node 304-1 of FIG. 3) of network intrusion detection system 302 determines if a request rate 334 of a request group (e.g., respective one of request groups 332 of FIG. 3) is greater than a request rate threshold 336.

In response to determining at operation 420 that request rate 334 of the request group (e.g., respective one of request groups 332 of FIG. 3) is greater than request rate threshold 336, method 400 continues to operation 422. At operation 422, the processor (e.g., processor 306-1 of FIG. 3) of the node (e.g., node 304-1 of FIG. 3) of network intrusion detection system 302 identifies the request group (e.g., respective one of request groups 332 of FIG. 3) as malicious.

At operation 424, the processor (e.g., processor 306-1 of FIG. 3) of the node (e.g., node 304-1 of FIG. 3) of network intrusion detection system 302 sends a notification 152 that the request group (e.g., respective one of request groups 332 of FIG. 3) is identified as malicious. In certain embodiments, the processor (e.g., processor 306-1 of FIG. 3) of the node (e.g., node 304-1 of FIG. 3) of network intrusion detection system 302 sends the notification 152 to a device of a network administrator. After performing operation 424, method 400 continues to operation 446.

In response to determining at operation 420 that request rate 334 of the request group (e.g., respective one of request groups 332 of FIG. 3) is less than or equal to request rate threshold 336, method 400 continues to operation 426. At operation 426, the processor (e.g., processor 306-1 of FIG. 3) of the node (e.g., node 304-1 of FIG. 3) of network intrusion detection system 302 analyzes parameters 110 of a suspicious request (e.g., respective one of suspicious requests 326 of FIG. 3) of the request group (e.g., respective one of request groups 332 of FIG. 3) to determine parameter values 328 of parameters 110 of the suspicious request (e.g., respective one of suspicious requests 326 of FIG. 3).

At operation 428, the processor (e.g., processor 306-1 of FIG. 3) of the node (e.g., node 304-1 of FIG. 3) of network intrusion detection system 302 determines if at least one of parameter values 328 of parameters 110 of the suspicious request (e.g., respective one of suspicious requests 326 of FIG. 3) matches with a respective malicious parameter value (e.g., respective one of malicious parameter values 318-1 of FIG. 3) from a block list (e.g., block list 316-1 of FIG. 3) that is stored in the node (e.g., node 304-1 of FIG. 3) of network intrusion detection system 302.

In response to determining at operation 428 that parameter values 328 of parameters 110 of the suspicious request (e.g., respective one of suspicious requests 326 of FIG. 3) do not match with respective malicious parameter values (e.g., malicious parameter values 318-1 of FIG. 3), method 400 continues to operation 430. At operation 430, the processor (e.g., processor 306-1 of FIG. 3) of the node (e.g., node 304-1 of FIG. 3) of network intrusion detection system 302 analyzes the suspicious request (e.g., respective one of suspicious requests 326 of FIG. 3) using neural network module 308 to identify if the suspicious request (e.g., respective one of suspicious requests 326 of FIG. 3) is legitimate or malicious.

At operation 432, the processor (e.g., processor 306-1 of FIG. 3) of the node (e.g., node 304-1 of FIG. 3) of network intrusion detection system 302 determines if the suspicious request (e.g., respective one of suspicious requests 326 of FIG. 3) is malicious.

In response to determining at operation 432 that the suspicious request (e.g., respective one of suspicious requests 326 of FIG. 3) is not malicious, method 400 continues to operation 434. At operation 434, the processor (e.g., processor 306-1 of FIG. 3) of the node (e.g., node 304-1 of FIG. 3) of network intrusion detection system 302 identifies the suspicious request (e.g., respective one of suspicious requests 326 of FIG. 3) as a legitimate request 338.

At operation 436, the processor (e.g., processor 306-1 of FIG. 3) of the node (e.g., node 304-1 of FIG. 3) of network intrusion detection system 302 forwards legitimate request 338 to service provider system 154. After performing operation 436, method 400 continues to operation 444.

In response to determining at operation 428 that at least one of parameter values 328 of parameters 110 of the suspicious request (e.g., respective one of suspicious requests 326 of FIG. 3) matches with a respective malicious parameter value (e.g., respective one of malicious parameter values 318-1 of FIG. 3) or in response to determining at operation 432 that the suspicious request (e.g., respective one of suspicious requests 326 of FIG. 3) is malicious, method 400 continues to operation 438. At operation 438, the processor (e.g., processor 306-1 of FIG. 3) of the node (e.g., node 304-1 of FIG. 3) of network intrusion detection system 302 identifies the suspicious request (e.g., respective one of suspicious requests 326 of FIG. 3) as malicious.

At operation 440, the processor (e.g., processor 306-1 of FIG. 3) of the node (e.g., node 304-1 of FIG. 3) of network intrusion detection system 302 sends a notification 152 that the suspicious request (e.g., respective one of suspicious requests 326 of FIG. 3) is identified as malicious. In certain embodiments, the processor (e.g., processor 306-1 of FIG. 3) of the node (e.g., node 304-1 of FIG. 3) of network intrusion detection system 302 sends the notification 152 to a device of a network administrator.

At operation 442, the processor (e.g., processor 306-1 of FIG. 3) of the node (e.g., node 304-1 of FIG. 3) of network intrusion detection system 302 adds parameter values 328 of parameters 110 of the suspicious request (e.g., respective one of suspicious requests 326 of FIG. 3) to the block list (e.g., block list 316-1 of FIG. 3).

After performing operations 436 or 442, method 400 continues to operation 444. At operation 444, the processor (e.g., processor 306-1 of FIG. 3) of the node (e.g., node 304-1 of FIG. 3) of network intrusion detection system 302 determines if all suspicious requests (e.g., respective ones of suspicious requests 326 of FIG. 3) of the request group (e.g., respective one of request groups 332 of FIG. 3) are analyzed.

In response to determining at operation 444 that all suspicious requests (e.g., respective ones of suspicious requests 326 of FIG. 3) of the request group (e.g., respective one of request groups 332 of FIG. 3) are not analyzed, method 400 continues to operation 426. In certain embodiments, operations 426 through 444 are performed one or more times until all suspicious requests (e.g., respective ones of suspicious requests 326 of FIG. 3) of the request group (e.g., respective one of request groups 332 of FIG. 3) are analyzed.

In response to determining at operation 444 that all suspicious requests (e.g., respective ones of suspicious requests 326 of FIG. 3) of the request group (e.g., respective one of request groups 332 of FIG. 3) are analyzed or after performing operation 424, method 400 continues to operation 446. At operation 446, the processor (e.g., processor 306-1 of FIG. 3) of the node (e.g., node 304-1 of FIG. 3) of network intrusion detection system 302 determines if all request groups (e.g., request groups 332 of FIG. 3) are analyzed.

In response to determining at operation 446 that all request groups (e.g., request groups 332 of FIG. 3) are not analyzed, method 400 continues to operation 420. In certain embodiments, operations 420 through 446 are performed one or more times until all request groups (e.g., request groups 332 of FIG. 3) are analyzed.

In response to determining at operation 446 that all request groups (e.g., request groups 332 of FIG. 3) are analyzed, method 400 continues to operation 448. At operation 448, the processor (e.g., processor 306-1 of FIG. 3) of the node (e.g., node 304-1 of FIG. 3) of network intrusion detection system 302 synchronizes that block list (e.g., block list 316-1 of FIG. 3) with block lists (e.g., rest of block lists 316-1 through 316-*m* of FIG. 3) of other nodes (e.g., rest of nodes 304-1 through 304-*m* of FIG. 3) of network intrusion detection system 302.

At operation 450, the processor (e.g., processor 306-1 of FIG. 3) of the node (e.g., node 304-1 of FIG. 3) of network intrusion detection system 302 determines if a request 174 to end the network intrusion detection process is received. In certain embodiments, the request 174 to end the network intrusion detection process may be received from a device of a network administrator.

In response to determining at operation 450 that the request 174 to end the network intrusion detection process is not received, method 400 continues to operation 406. In certain embodiments, operations 406 through 450 are performed one or more times until the request 174 to end the network intrusion detection process is received. In response to determining at operation 450 that the request 174 to end the network intrusion detection process is received, method 400 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a plurality of nodes, wherein a first node comprises:
   a memory configured to store:
      a request rate threshold; and
      a block list, wherein the block list comprises a list of malicious parameter values associated with parameters of malicious requests, and wherein a malicious request comprises a request that originates from a malicious user; and
   a processor communicatively coupled to the memory, the processor configured to implement a neural network module, wherein the processor is configured to:
      intercept a plurality of requests directed to a service provider system from a respective geographical region for a first duration, wherein each request comprises a request for a service from the service provider system;
      analyze the plurality of requests to identify authenticated requests from the plurality of requests, wherein the authenticated requests originate from one or more authenticated users;
      identify remaining requests as suspicious requests;
      analyze each suspicious request to determine respective geolocation information of a respective location from which each suspicious request originates;
      group the suspicious requests into a plurality of request groups based on the determined geolocation information, wherein:
         a first request group is associated with a first geolocation information and comprises a first plurality of suspicious requests associated with the first geolocation information; and
         a second request group is associated with a second geolocation information and comprises a second plurality of suspicious requests associated with the second geolocation information, wherein the second geolocation information is different from the first geolocation information;
      determine a first rate of requests for the first request group;
      determine a second rate of requests for the second request group; and
      in response to determining that the first rate of requests for the first request group is less than or equal to the request rate threshold:
         analyze parameters of a first suspicious request of the first request group to determine values of the parameters of the first suspicious request; and
         in response to determining that the value of the parameters of the first suspicious request do not match with respective malicious parameter values:
            analyze the first suspicious request using the neural network module to identify if the first suspicious request is legitimate or malicious; and
            in response to identifying that the first suspicious request is malicious:
               send a first notification that the first suspicious request is identified as malicious;
               add the values of the parameters of the first suspicious request to the block list; and
               synchronize the block list with other nodes of the plurality of nodes.

2. The system of claim 1, wherein the processor is further configured to forward the authenticated requests to the service provider system.

3. The system of claim 1, wherein the processor is further configured to, in response to determining that the second rate of requests for the second request group is greater than the request rate threshold:
   identify the second request group as malicious; and
   send a second notification that the first request group is identified as malicious.

4. The system of claim 1, wherein the processor is further configured to:
   analyze parameters of a second suspicious request of the first request group to determine values of the parameters of the second suspicious request; and
   in response to determining that a value of a parameter of the second suspicious request matches with a respective malicious parameter value:
      identify the second suspicious request as malicious; and
      send a second notification that the second suspicious request is identified as malicious.

5. The system of claim 1, wherein the processor is further configured to:
- analyze parameters of a third suspicious request of the first request group to determine values of the parameters of the third suspicious request; and
- in response to determining that the value of the parameters of the third suspicious request do not match with respective malicious parameter values:
  - analyze the third suspicious request using the neural network module to identify if the third suspicious request is legitimate or malicious; and
  - in response to identifying that the third suspicious request is a legitimate request, forward the legitimate request to the service provide system.

6. The system of claim 1, wherein the processor is further configured to:
- receive a plurality of known legitimate requests and a plurality of known malicious requests; and
- train the neural network module by using the plurality of known legitimate requests and the plurality of known malicious requests as a training set.

7. The system of claim 1, wherein:
- each of the plurality of requests comprise a network packet; and
- the parameters of each request comprise parameters of the network packet.

8. A method comprising:
- intercepting a plurality of requests directed to a service provider system from a respective geographical region for a first duration, wherein each request comprises a request for a service from the service provider system;
- analyzing the plurality of requests to identify authenticated requests from the plurality of requests, wherein the authenticated requests originate from one or more authenticated users;
- identifying remaining requests as suspicious requests;
- analyzing each suspicious request to determine respective geolocation information of a respective location from which each suspicious request originates;
- grouping the suspicious requests into a plurality of request groups based on the determined geolocation information, wherein:
  - a first request group is associated with a first geolocation information and comprises a first plurality of suspicious requests associated with the first geolocation information; and
  - a second request group is associated with a second geolocation information and comprises a second plurality of suspicious requests associated with the second geolocation information, wherein the second geolocation information is different from the first geolocation information;
- determining a first rate of requests for the first request group;
- determining a second rate of requests for the second request group; and
- in response to determining that the first rate of requests for the first request group is less than or equal to a request rate threshold:
  - analyzing parameters of a first suspicious request of the first request group to determine values of the parameters of the first suspicious request; and
  - in response to determining that the value of the parameters of the first suspicious request do not match with respective malicious parameter values stored in a block list:
    - analyzing the first suspicious request using a neural network to identify if the first suspicious request is legitimate or malicious; and
    - in response to identifying that the first suspicious request is malicious:
      - sending a first notification that the first suspicious request is identified as malicious; and
      - adding the values of the parameters of the first suspicious request to the block list.

9. The method of claim 8, further comprising forwarding the authenticated requests to the service provider system.

10. The method of claim 8, further comprising, in response to determining that the second rate of requests for the second request group is greater than the request rate threshold:
- identifying the second request group as malicious; and
- sending a second notification that the first request group is identified as malicious.

11. The method of claim 8, further comprising:
- analyzing parameters of a second suspicious request of the first request group to determine values of the parameters of the second suspicious request; and
- in response to determining that a value of a parameter of the second suspicious request matches with a respective malicious parameter value:
  - identifying the second suspicious request as malicious; and
  - sending a second notification that the second suspicious request is identified as malicious.

12. The method of claim 8, further comprising:
- analyzing parameters of a third suspicious request of the first request group to determine values of the parameters of the third suspicious request; and
- in response to determining that the value of the parameters of the third suspicious request do not match with respective malicious parameter values:
  - analyzing the third suspicious request using the neural network to identify if the third suspicious request is legitimate or malicious; and
  - in response to identifying that the third suspicious request is a legitimate request, forwarding the legitimate request to the service provide system.

13. The method of claim 8, further comprising:
- receiving a plurality of known legitimate requests and a plurality of known malicious requests; and
- training the neural network by using the plurality of known legitimate requests and the plurality of known malicious requests as a training set.

14. The method of claim 8, wherein:
- each of the plurality of requests comprise a network packet; and
- the parameters of each request comprise parameters of the network packet.

15. A non-transitory computer-readable medium storing instructions that, when executed by one or more processors, cause the one or more processors to:
- intercept a plurality of requests directed to a service provider system from a respective geographical region for a first duration, wherein each request comprises a request for a service from the service provider system;
- analyze the plurality of requests to identify authenticated requests from the plurality of requests, wherein the authenticated requests originate from one or more authenticated users;
- identify remaining requests as suspicious requests;

analyze each suspicious request to determine respective geolocation information of a respective location from which each suspicious request originates;

group the suspicious requests into a plurality of request groups based on the determined geolocation information, wherein:
- a first request group is associated with a first geolocation information and comprises a first plurality of suspicious requests associated with the first geolocation information; and
- a second request group is associated with a second geolocation information and comprises a second plurality of suspicious requests associated with the second geolocation information, wherein the second geolocation information is different from the first geolocation information;

determine a first rate of requests for the first request group;

determine a second rate of requests for the second request group; and in response to determining that the first rate of requests for the first request group is less than or equal to a request rate threshold:
- analyze parameters of a first suspicious request of the first request group to determine values of the parameters of the first suspicious request; and
- in response to determining that the value of the parameters of the first suspicious request do not match with respective malicious parameter values stored in a block list:
  - analyze the first suspicious request using a neural network to identify if the first suspicious request is legitimate or malicious; and
  - in response to identifying that the first suspicious request is malicious:
    - send a first notification that the first suspicious request is identified as malicious; and
    - add the values of the parameters of the first suspicious request to the block list.

16. The non-transitory computer-readable medium of claim 15, wherein the instructions, when executed by the one or more processors, further cause the one or more processors to forward the authenticated requests to the service provider system.

17. The non-transitory computer-readable medium of claim 15, wherein the instructions, when executed by the one or more processors, further cause the one or more processors to, in response to determining that the second rate of requests for the second request group is greater than the request rate threshold:
- identify the second request group as malicious; and
- send a second notification that the first request group is identified as malicious.

18. The non-transitory computer-readable medium of claim 15, wherein the instructions, when executed by the one or more processors, further cause the one or more processors to:
- analyze parameters of a second suspicious request of the first request group to determine values of the parameters of the second suspicious request; and
- in response to determining that a value of a parameter of the second suspicious request matches with a respective malicious parameter value:
  - identify the second suspicious request as malicious; and
  - send a second notification that the second suspicious request is identified as malicious.

19. The non-transitory computer-readable medium of claim 15, wherein the instructions, when executed by the one or more processors, further cause the one or more processors to:
- analyze parameters of a third suspicious request of the first request group to determine values of the parameters of the third suspicious request; and
- in response to determining that the value of the parameters of the third suspicious request do not match with respective malicious parameter values:
  - analyze the third suspicious request using the neural network to identify if the third suspicious request is legitimate or malicious; and
  - in response to identifying that the third suspicious request is a legitimate request, forward the legitimate request to the service provide system.

20. The non-transitory computer-readable medium of claim 15, wherein the instructions, when executed by the one or more processors, further cause the one or more processors to:
- receive a plurality of known legitimate requests and a plurality of known malicious requests; and
- train the neural network by using the plurality of known legitimate requests and the plurality of known malicious requests as a training set.

* * * * *